(12) United States Patent
Kim et al.

(10) Patent No.: US 9,391,333 B2
(45) Date of Patent: Jul. 12, 2016

(54) PULSATING OPERATION METHOD AND SYSTEM FOR FUEL CELL SYSTEM

(71) Applicant: Hyundai Motor Company, Seoul (KR)

(72) Inventors: Jae Hoon Kim, Gyeonggi-do (KR); Yong Sheen Hwang, Gyeonggi-do (KR)

(73) Assignee: Hyundai Motor Company, Seoul (KR)

( * ) Notice: Subject to any disclaimer, the term of this patent is extended or adjusted under 35 U.S.C. 154(b) by 332 days.

(21) Appl. No.: 13/916,048

(22) Filed: Jun. 12, 2013

(65) Prior Publication Data

US 2014/0170518 A1  Jun. 19, 2014

(30) Foreign Application Priority Data

Dec. 14, 2012  (KR) ................. 10-2012-0146001

(51) Int. Cl.
*H01M 8/04* (2016.01)

(52) U.S. Cl.
CPC ...... *H01M 8/04753* (2013.01); *H01M 8/04179* (2013.01); *H01M 8/04619* (2013.01); *Y02E 60/50* (2013.01)

(58) Field of Classification Search
CPC .............. H01M 8/04179; H01M 8/04753; H01M 8/04619; Y02E 60/50
See application file for complete search history.

(56) References Cited

U.S. PATENT DOCUMENTS

| 2009/0263684 A1* | 10/2009 | Masui ............... C01B 3/382 429/425 |
| 2012/0107711 A1* | 5/2012 | Tomita ............ H01M 8/04388 429/446 |
| 2013/0164649 A1* | 6/2013 | Nishimura ....... H01M 8/04089 429/444 |
| 2014/0093803 A1* | 4/2014 | Nishimura ....... H01M 8/04104 429/446 |

FOREIGN PATENT DOCUMENTS

| JP | 2005-063712 A | 3/2005 |
| JP | 2007035450 A | 2/2007 |
| JP | 2007280844 A | 10/2007 |
| KR | 10-2010-0063247 | 6/2010 |

* cited by examiner

*Primary Examiner* — Muhammad Siddiquee
(74) *Attorney, Agent, or Firm* — Mintz Levin Cohn Ferris Glovsky and Popeo, P.C.; Peter F. Corless

(57) ABSTRACT

A pulsating operation method and system for a fuel cell system that smoothly discharges water remaining in a fuel electrode of a fuel cell and, simultaneously, improves fuel utilization. The method includes performing a pulsation control that controls the magnitude and period of a pulsating operating pressure for hydrogen supplied to an anode of a fuel cell to smoothly discharge the water remaining in the anode, maximize fuel utilization of the anode, and improve operational stability of the fuel cell system.

7 Claims, 6 Drawing Sheets

US 9,391,333 B2

PULSATING OPERATION METHOD AND SYSTEM FOR FUEL CELL SYSTEM

CROSS-REFERENCE TO RELATED APPLICATION

This application claims under 35 U.S.C. §119(a) the benefit of Korean Patent Application No. 10-2012-0146001 filed Dec. 14, 2012, the entire contents of which are incorporated herein by reference.

BACKGROUND (a) Technical Field

The present invention relates to a pulsating operation method and system for a fuel cell system. More particularly, the present invention relates to a pulsating operation method for a fuel cell system, which smoothly discharges water remaining in a fuel electrode of a fuel cell and, at the same time, maximizes fuel utilization.

(b) Background Art

Typically, fuel cell systems include a fuel cell stack that generates electricity via an electrochemical reaction, a fuel supply system supplying hydrogen as a fuel to the fuel cell stack, an air supply system supplying oxygen-containing air as an oxidant required for the electrochemical reaction in the fuel cell stack, a thermal management system (TMS) that removes reaction heat from the fuel cell stack to the outside of the fuel cell system, controlling operation temperature of the fuel cell stack, and performing water management.

The above configuration and operation of the fuel supply system in the fuel cell system will be described with respect to FIG. 1A. Fuel supplied along a hydrogen supply line 18 from a fuel tank is fed into a fuel electrode (anode) 12 of a fuel cell through an anode inlet 14 of the fuel cell and subjected to a reaction to generate electricity, and a portion of unreacted hydrogen is discharged through an anode outlet 16.

At this time, the operating pressure of the anode of fuel cell is maintained at a predetermined pressure regardless of the operating time of the fuel cell as shown in FIG. 1B. Moreover, a portion of unreacted hydrogen discharged through an anode outlet 16 is recirculated to the anode inlet 14 by the operation of a recirculation device 20 (e.g., a recirculation blower motor) and the remaining hydrogen passes through a hydrogen purge valve 22 together with water and is discharged to the outside. As such, the recirculation device 20 is connected to the anode outlet 16 of the fuel cell such that the unreacted hydrogen remaining in the anode 12 is recirculated to the anode inlet 14 and reused for the purpose of discharging water from the anode 12.

Meanwhile, water is generated by the reaction to generate electricity and remains in a channel in the anode of the fuel cell, and the remaining water may cause corrosion of a catalyst layer that constitutes the anode of the fuel cell. Thus, the remaining water needs to be smoothly discharged. Therefore, as shown in FIG. 2A, a separate pulsation generator 24 that pulsates the operating pressure of the fuel supplied to the anode is installed at a certain position of the hydrogen supply line.

When the unreacted hydrogen is supplied again to the anode 12 of the fuel cell by the operation of the recirculation device 20, the hydrogen being supplied to the anode 12 by the pulsating force of the pulsation generator 24 has a pulsating flow force, and the water remaining in the anode 12 is moved by the pulsating flow force and discharged toward the anode outlet 16, thus improving operational stability of the fuel cell system.

In more detail, before the fuel (e.g., hydrogen) is supplied to the anode 12 of the fuel cell, the pulsation generator 24 generates a pulsating flow pressure (see FIG. 2B), (i.e., a hydrogen supply pressure) repeatedly controlled between an upper limit and a lower limit, to generate a pulsating flow force in the hydrogen supplied to the anode 12. Accordingly, the water remaining in the channel of the anode 12 of the fuel cell is moved by the pulsating flow force and discharged toward the anode outlet 16, thus improving the operational stability of the fuel cell system and increasing the purge cycle of the hydrogen purge valve for water discharge.

Therefore, when the pulsation generator is used, the discharge rate of the water remaining in the channel of the anode increases twice as much, compared to a system that does not use a pulsation generator, as shown in FIG. 3A, which prevents flooding in the anode, thus improving the operational stability of the fuel cell system.

However, there are the following drawbacks due to excessive pulsation of the pulsation generator.

First, an excessive amount of water is discharged by the excessive pulsation of the pulsation generator, and thus the water in the anode channel is reduced. That is, due to continuous generation of pulsations by the pulsation generator, the discharge of the water in the anode channel increases, which causes an excessive reduction of water in the anode channel, and thus the amount of liquid water ($H_2O$) moved from the cathode to the anode increases, which reduces the amount of water in the cathode, thus causing dry-out in the entire fuel cell including the anode and the cathode, resulting in a reduction in the fuel cell performance and durability.

Second, since the operating pressure of the anode is continuously maintained at the pulsating pressure, the operating pressure generated in the anode increases, which increases the amount of fuel crossed over from the anode to the cathode. As a result, the fuel (e.g., hydrogen) consumption increases by about 2.5%, compared to a system that does not use a pulsation generator, as shown in FIG. 3B, which reduces the fuel utilization, and thus the efficiency of the fuel cell system is reduced by the reduction in the fuel utilization.

The above information disclosed in this section is only for enhancement of understanding of the background of the invention and therefore it may contain information that does not form the prior art that is already known in this country to a person of ordinary skill in the art.

SUMMARY

The present invention provides a pulsating operation method and system for a fuel cell system, in which a pulsation control that controls the magnitude and period of a pulsating operating pressure for hydrogen supplied to an anode of a fuel cell is performed to smoothly discharge water remaining in the anode, maximize fuel utilization of the anode, and improve operational stability of the fuel cell system.

In one aspect, the present invention provides a pulsating operation method for a fuel cell system, the method including performing a pulsation control that controls the magnitude and period of a pulsating operating pressure for fuel supplied to an anode of a fuel cell during an opening period of a hydrogen purge valve connected an anode outlet to maintain water discharge in the anode and fuel utilization of the anode.

In an exemplary embodiment, the pulsation control is performed when the current power of the fuel cell system is below a predetermined power.

In another exemplary embodiment, when the current power of the fuel cell system is below a predetermined power, a control that increases the opening period of the hydrogen purge valve, a control that reduces the opening time of the hydrogen purge valve, and a control that reduces the number of rotations of a recirculation device for fuel recirculation are performed prior to the pulsation control.

In still another exemplary embodiment, the pulsation control is performed only when the current power is below about 40% of the maximum power of the fuel cell system.

In yet another exemplary embodiment, the pulsation control is performed by repeating an N number of pulsation periods and a non-pulsation period under a constant operating pressure between the N number of pulsation periods.

In still yet another exemplary embodiment, the pulsation control is performed during the opening period of the hydrogen purge valve, the opening period ranging from the closing after fuel purge to the opening for the next purge.

In a further exemplary embodiment, during the pulsation control, the total pulsating pressure maintenance time is maintained for less than about 70% of the opening period of the hydrogen purge valve.

In another further exemplary embodiment, the pulsation control is performed in a low power region of the fuel cell and is not performed in middle and high power regions.

BRIEF DESCRIPTION OF THE DRAWINGS

The above and other features of the present invention will now be described in detail with reference to certain exemplary embodiments thereof illustrated the accompanying drawings which are given hereinbelow by way of illustration only, and thus are not limitative of the present invention, and wherein.

Figure 1A:
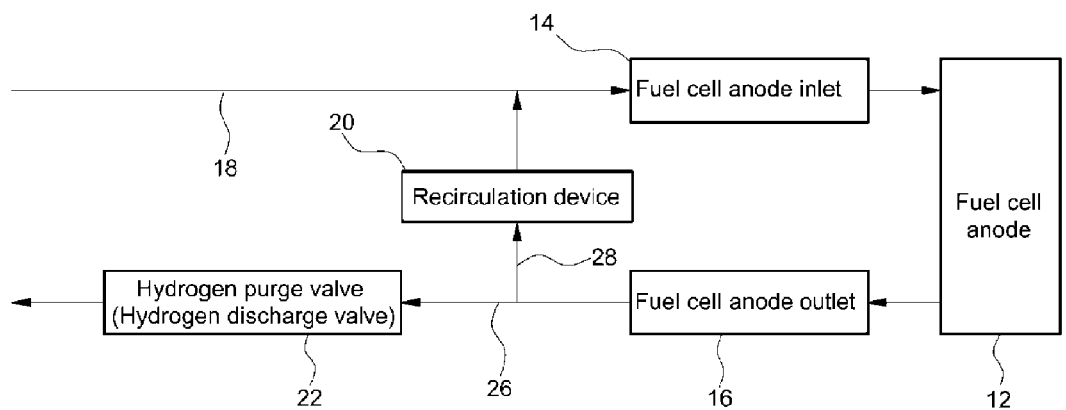
FIG. 1A is an exemplary diagram showing the configuration of a fuel supply system of a fuel cell system according to the related art.
Figure 1B:
FIG. 1B is an exemplary graph showing an operating pressure that supplies fuel in the fuel supply system in FIG. 1A according to the related art.

Reference numerals set forth in the Drawings includes reference to the following elements as further discussed below:

| 12: anode | 14: anode inlet |
|---|---|
| 16: anode outlet | 18: hydrogen supply line |

-continued

| 20: recirculation device | 22: hydrogen purge valve |
|---|---|
| 24: pulsation generator | 26: hydrogen discharge line |
| 28: recirculation line | |

It should be understood that the accompanying drawings are not necessarily to scale, presenting a somewhat simplified representation of various exemplary features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Hereinafter reference will now be made in detail to various exemplary embodiments of the present invention, examples of which are illustrated in the accompanying drawings and described below. While the invention will be described in conjunction with exemplary embodiments, it will be understood that present description is not intended to limit the invention to those exemplary embodiments. On the contrary, the invention is intended to cover not only the exemplary embodiments, but also various alternatives, modifications, equivalents and other embodiments, which may be included within the spirit and scope of the invention as defined by the accompanying claims.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g., fuels derived from resources other than petroleum). As referred to herein, a hybrid vehicle is a vehicle that has two or more sources of power, for example both gasoline-powered and electric-powered vehicles.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Additionally, it is understood that the term controller refers to a hardware device that includes a memory and a processor. The memory is configured to store the modules and the processor is specifically configured to execute said modules to perform one or more processes which are described further below.

Furthermore, control logic of the present invention may be embodied as non-transitory computer readable media on a computer readable medium containing executable program instructions executed by a processor, controller or the like.

Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a telematics server or a Controller Area Network (CAN).

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

Figure 2A:
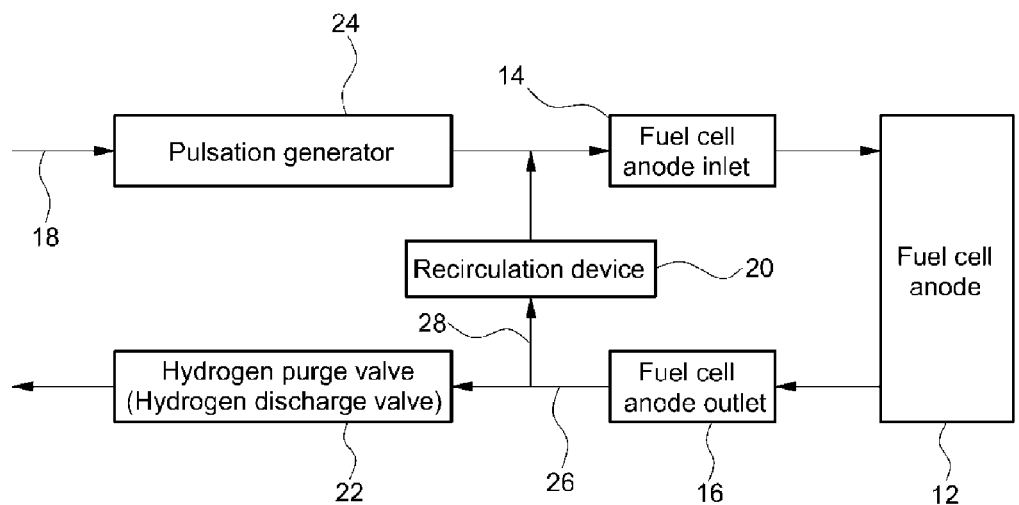
FIG. 2A is an exemplary diagram showing of a pulsation generator disposed in a fuel supply system of a fuel cell system according to the related art.
Figure 2B:
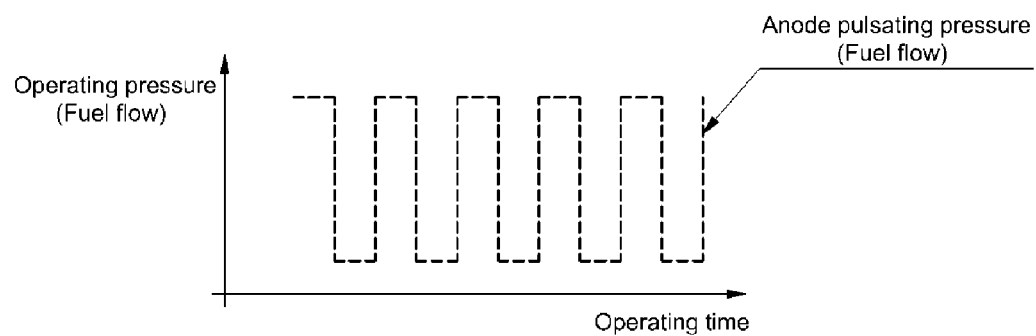
FIG. 2B is an exemplary graph showing a pulsating operating pressure by the pulsation generator in FIG. 2A according to the related art.
Figure 3A:
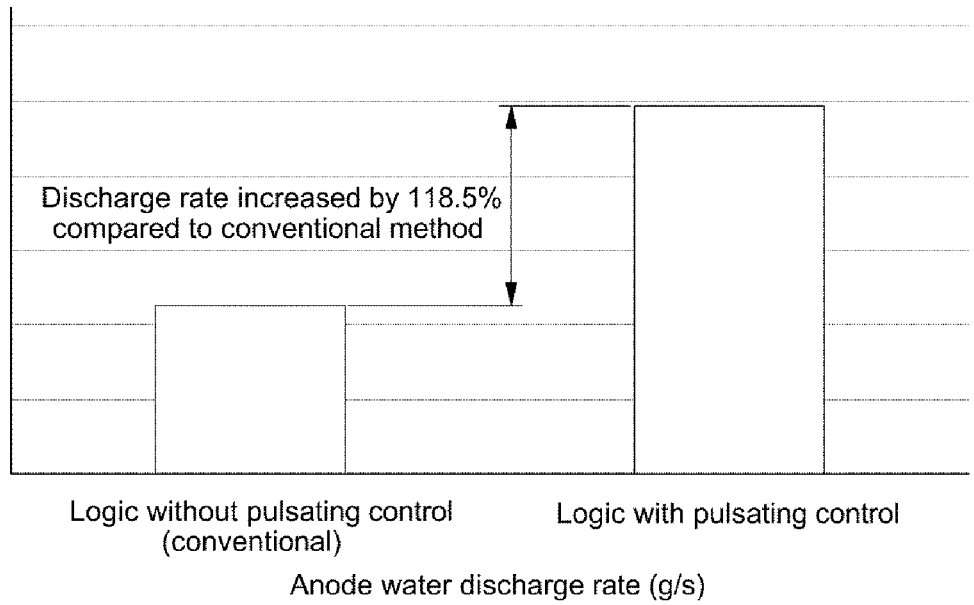
FIGS. 3A and 3B are exemplary graphs showing the water discharge rate and the fuel consumption by the pulsating operating pressure of the pulsation generator according to the related art.
Figure 3B:
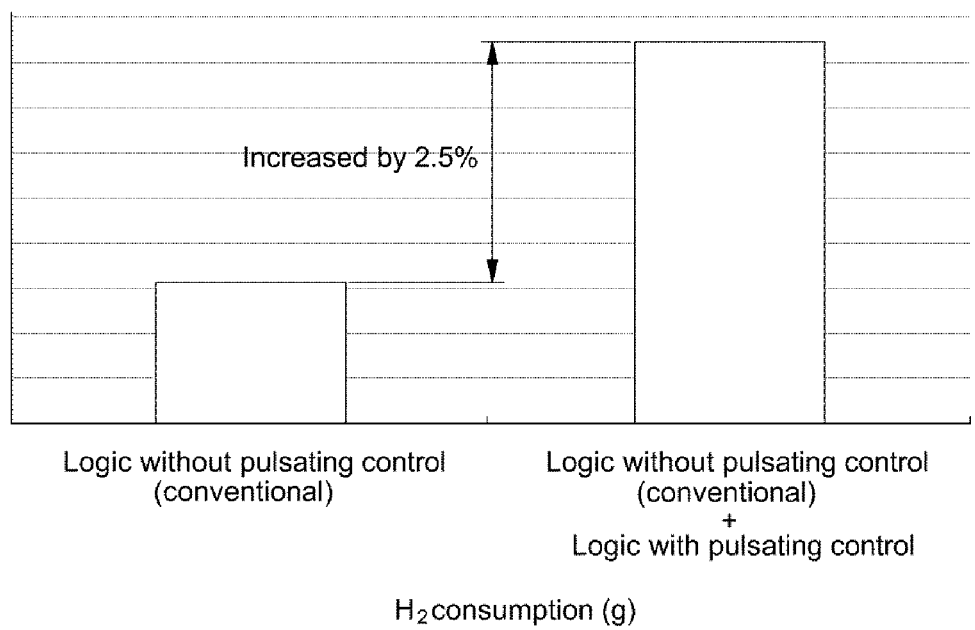
Figure 4A:
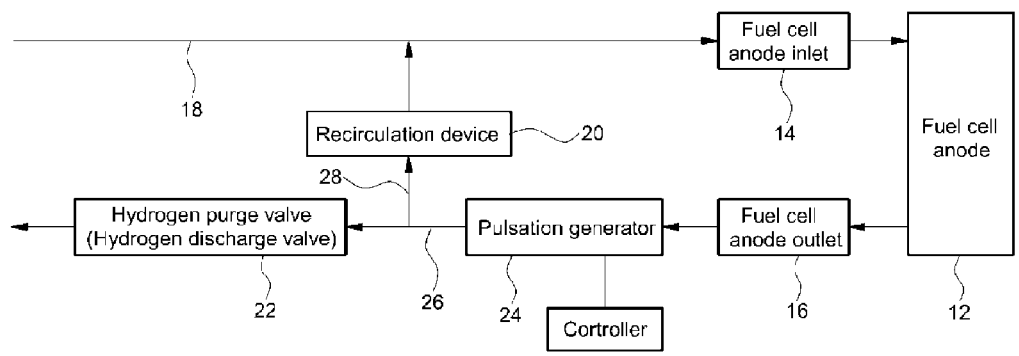
FIGS. 4A to 4C are exemplary diagrams showing pulsation generators disposed in the fuel supply system according to the related art.

Referring to FIGS. 2A and 4A, a hydrogen supply line 18 connected to an anode inlet 14 of a fuel cell and a hydrogen discharge line 26 connected to an anode outlet 16 are connected to a recirculation line 28, and a recirculation device 20 that recirculates unreacted hydrogen discharged from the anode outlet 16 to an anode 12 through the anode inlet 14 is mounted in the recirculation line 28 to facilitate water discharge.

A separate pulsation generator 24 that pulsates the operating pressure of fuel supplied to the anode is installed at a certain position of the hydrogen supply line 18 as shown in FIG. 2A or at a certain position of the hydrogen discharge line 26 as shown in FIG. 4A.

Accordingly, when fresh hydrogen from a hydrogen tank is supplied to the anode 12 of the fuel cell or when unreacted hydrogen is supplied again to the anode 12 of the fuel cell by the operation of the recirculation device 20, the hydrogen being supplied to the anode 12 may have a pulsating flow force by the pulsating force of the pulsation generator 24, and the water remaining in the anode 12 may be moved by the pulsating flow force and discharged toward the anode outlet 16.

Figure 4B:
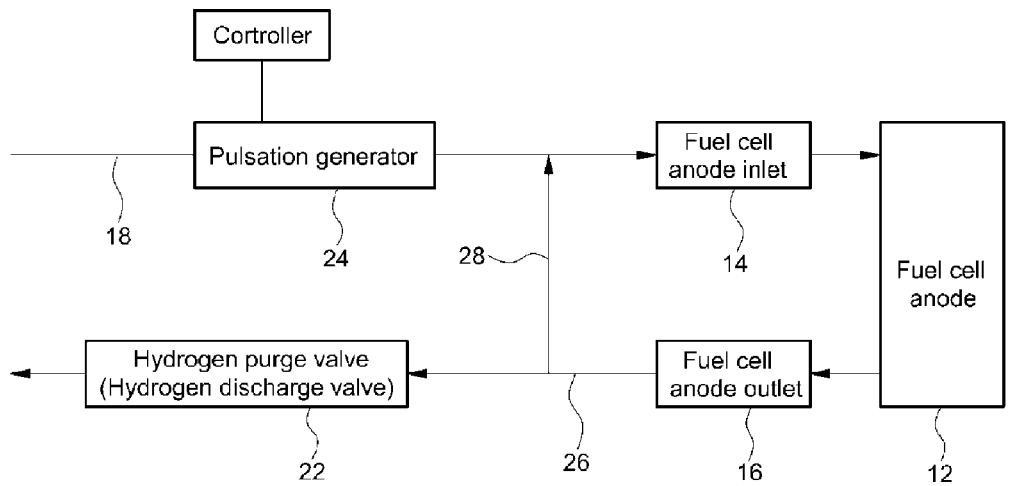
Figure 4C:
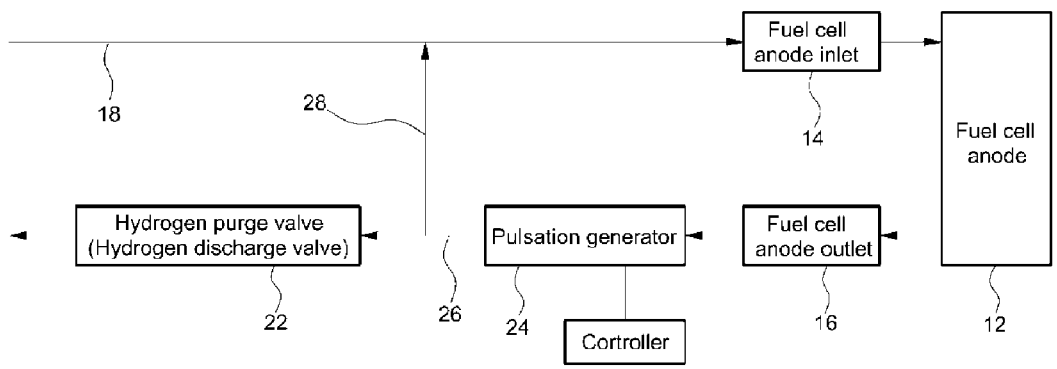

Referring to FIGS. 4B and 4C, the pulsation generator 24 may be installed at a certain position of the hydrogen supply line 18 or the hydrogen discharge line 26 without the recirculation device 20 in the recirculation line 28. In particular, the recirculation device 20, executed by a controller, may be configured to recirculate the unreacted hydrogen to the anode 12 as a fluid for water discharge, and when the pulsation generator 24 is disposed separately, the recirculation device 20 may not be installed. That is, fresh hydrogen from the hydrogen tank may be supplied to the anode by the pulsating pressure of the pulsation generator 24 to facilitate the water discharge, and thus the recirculation device 20 may be eliminated.

A pulsating operation method of the present invention, executed by a controller, based on the pulsation generator installed at a certain position of the hydrogen supply line or the hydrogen discharge line, regardless of the installation of the recirculation device, will be described with respect to FIGS. 4 to 6 below.

When the unreacted hydrogen or fresh hydrogen from the hydrogen tank is supplied to the anode 12 of the fuel cell along the hydrogen supply line 18 by the operation of the recirculation device 20 as described above, a pulsation control that generates a pulsating pressure may be performed by the pulsation generator 24, executed by the controller, and thus the hydrogen being supplied to the anode 12 may have a pulsating flow force by the pulsating pressure.

According to the present invention, the pulsation control of the pulsation generator may be performed to smoothly discharge the water remaining in the anode of the fuel cell and to maximize fuel utilization. That is, the pulsation control of the present invention may be performed to control the magnitude and period of the pulsating operating pressure for the hydrogen supplied to the anode of the fuel cell during an opening period of a hydrogen purge valve connected to the anode outlet, in which the pulsation control may be performed to maintain the water discharge from the anode and the fuel utilization of the anode. In particular, the opening period of the hydrogen purge valve refers to an opening period ranging from the closing of the hydrogen purge valve after being opened to discharge hydrogen along with water to the opening of the hydrogen purge valve for the next purge.

Figure 5:
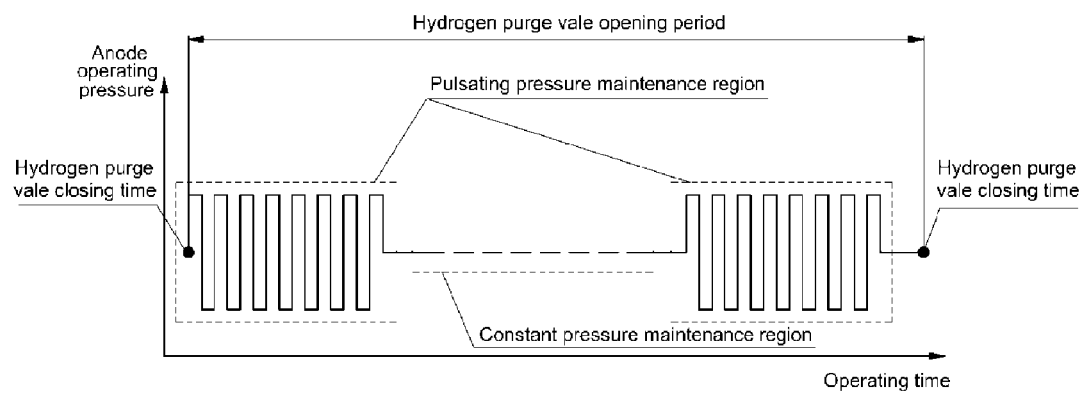
FIG. 5 is an exemplary diagram showing a pulsating operation method for a fuel cell system according to an exemplary embodiment of the present invention.
Figure 6:
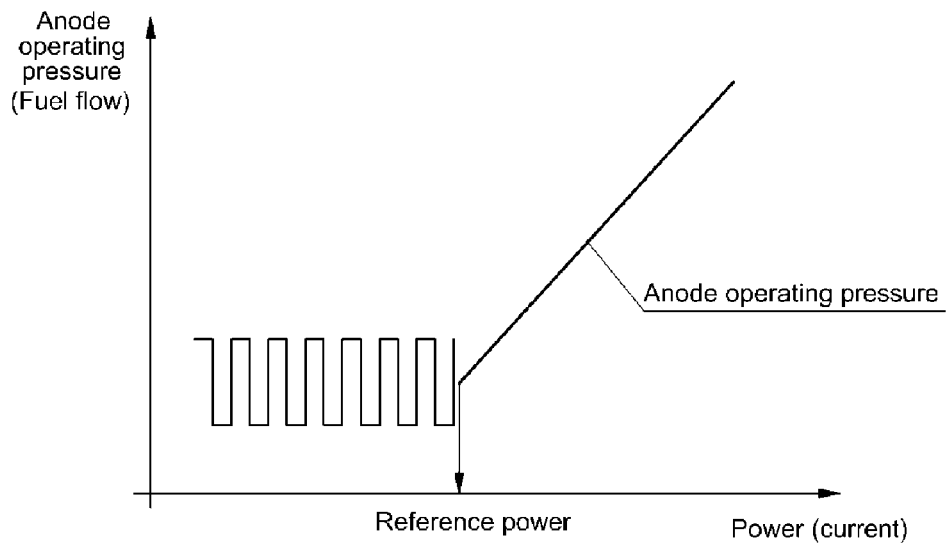
FIG. 6 is an exemplary diagram showing a pulsating operation method for a fuel cell system according to another exemplary embodiment of the present invention.
Figure 7:
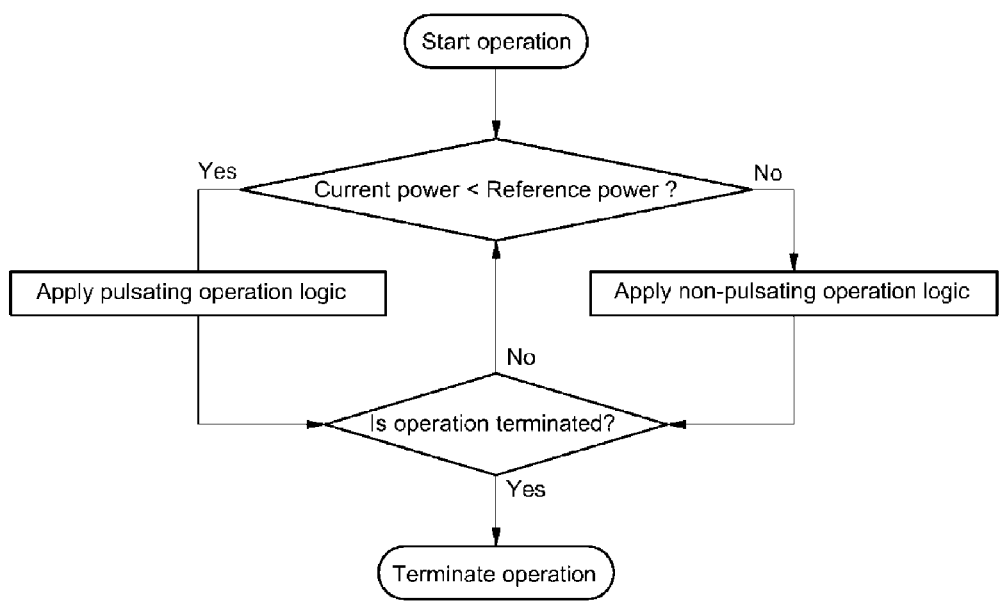
FIG. 7 is an exemplary flowchart showing a pulsating operation method for a fuel cell system according to an exemplary embodiment of the present invention.

In an exemplary embodiment of the pulsation control according to the present invention, as shown in FIG. 5, during the opening period of the hydrogen purge valve, an N number of pulsation periods maintained by the pulsating operation of the pulsation generator and a non-pulsation period under a constant operating pressure maintained by the non-operated pulsation generator may be repeated.

Furthermore, in the N number of pulsation periods, the pulsating pressures between an upper limit and a lower limit may be repeated by the pulsation generator to allow the fuel (e.g., hydrogen) to be supplied to the anode of the fuel cell to have a pulsating flow force by the pulsating pressure before the hydrogen is supplied to the anode. Accordingly, an excess of water remaining in the anode channel of the fuel cell may be discharged through the anode outlet by the pulsating flow force, which may facilitate the water discharge, thus improving the operational stability of the fuel cell system.

Moreover, in contrast with the related art, in which the operating pressure of the anode is maintained at a constant pulsating pressure, which reduces the fuel utilization, the present invention may improve the fuel discharge cycle and the opening time of a fuel discharge valve with the optimization of the pulsation control, thus ensuring a reduction in fuel consumption and an increase in fuel utilization (fuel efficiency). In particular, the pulsating pressure maintenance time by the N number of pulsation periods may be maintained for less than about 70% of the opening period of the hydrogen purge valve to prevent dry-out due to excessive water discharge from the anode by excessive pulsation. [Great! Thanks!]

The pulsation control of the present invention may be performed when the current power output of the fuel cell system is lower than a predetermined power output. In particular, as shown in FIG. 6, the pulsation control of the present invention may be performed only at a low power output region where the current power output is below about 40% of the maximum power output of the fuel cell system and may not be performed at middle and high power output regions where the current power output is above 40% of the maximum power of the fuel cell system.

The pulsation control of the present invention may be performed only in the low power output region where the current power output is below about 40% of the maximum power output of the fuel cell system since the pulsating operation for the water discharge may be eliminated due to the amount of fuel (e.g., hydrogen) supplied increasing to facilitate the removal of water (liquid $H_2O$) in the middle and high power output regions where the current output power is above about 40% of the maximum power output of the fuel cell system and since when the pulsating operation is performed in the middle and high power output regions, the anode pressure may be increased causing instability of the fuel cell system.

Furthermore, by the pulsation control of the present invention, the opening period of the hydrogen purge valve may be increased compared to the methods of the related art, the opening time of the hydrogen purge valve may be reduced, and the number of rotations of the recirculation device for fuel recirculation may be reduced. In other words, conventionally, a constant pulsating pressure for the anode is provided, the water is excessively discharged together with unreacted hydrogen, and the opening period of the hydrogen purge valve must be reduced due to the excessive water discharge. However, the present invention may control the magnitude and period of the pulsating operating pressure, and thus the opening period of the hydrogen purge valve may be increased and, simultaneously, the opening time may be reduced.

Moreover, by the pulsation control of the present invention, the fuel utilization in the anode may be increased and, at simultaneously, the fuel consumption may be reduced. Thus, the amount of unreacted hydrogen in the anode may be reduced, thus reducing the amount of hydrogen for recirculation, and the number of rotations of the recirculation device, thus improving the durability of the recirculation device.

As described above, the present invention provides the following effects.

By the pulsation control that controls the magnitude and period of the pulsating operating pressure for the fuel supplied to the anode of the fuel cell, performed by repeating an N number of pulsation periods and a non-pulsation period under a constant operating pressure between the N number of pulsation periods, water remaining in the anode may be smoothly discharged and, simultaneously, the fuel utilization of the anode may be improved.

In particular, compared to the existing pulsation operation method, it may be possible to improve the fuel utilization (i.e., fuel efficiency) of the fuel cell through a reduction in fuel (e.g., hydrogen) consumption, thus improving the operational stability of the fuel cell system. In addition, it may be possible to prevent an increase in the amount of hydrogen crossed over from the anode to the cathode and dry-out of the anode due to excessive pulsation. Furthermore, it may be possible to optimize the fuel discharge cycle and the opening time of the fuel discharge valve with the optimization of the pulsation control, thus ensuring a reduction in fuel consumption and an increase in fuel utilization (fuel efficiency).

The invention has been described in detail with reference to exemplary embodiments thereof. However, it will be appreciated by those skilled in the art that changes may be made in these embodiments without departing from the principles and spirit of the invention, the scope of which is defined in the accompanying claims and their equivalents.

What is claimed is:

1. A pulsating operation method for a fuel cell system, the method comprising:
   performing, by a controller, a pulsation control that controls a magnitude and a period of a pulsating operating pressure for fuel supplied to an anode of a fuel cell during an opening period of a hydrogen purge valve connected to an anode outlet to maintain water discharge in the anode and fuel utilization of the anode,
   wherein the pulsation control is performed by repeating an N number of pulsation periods and a non-pulsation period under a constant operating pressure between the N number of pulsation periods.

2. The method of claim 1, wherein the pulsation control is performed when a current power output of the fuel cell system is below a predetermined power output.

3. The method of claim 2, wherein when the current power output of the fuel cell system is below a predetermined power, the method further comprises:
   increasing, by the controller, the opening period of the hydrogen purge valve;
   reducing, by the controller, the opening time of the hydrogen purge valve; and
   reducing, by the controller, a number of rotations of a recirculation device for fuel recirculation prior to performing the pulsation control.

4. The method of claim 1, wherein the pulsation control is performed only when the current power output is below about 40% of the maximum power output of the fuel cell system.

5. The method of claim 1, wherein the pulsation control is performed during the opening period of the hydrogen purge valve, and the opening period ranges from the closing after fuel purge to the opening for the next purge.

6. The method of claim 5, wherein during the pulsation control, the method further comprises:
   maintaining, by the controller, the total pulsating pressure maintenance time for less than about 70% of the opening period of the hydrogen purge valve.

7. The method of claim 1, wherein the pulsation control is performed in a low power output region of the fuel cell and is not performed in middle and high power output regions.

* * * * *